May 8, 1934.   A. S. LLOYD   1,957,893
POWER SYSTEM
Filed Jan. 22, 1931
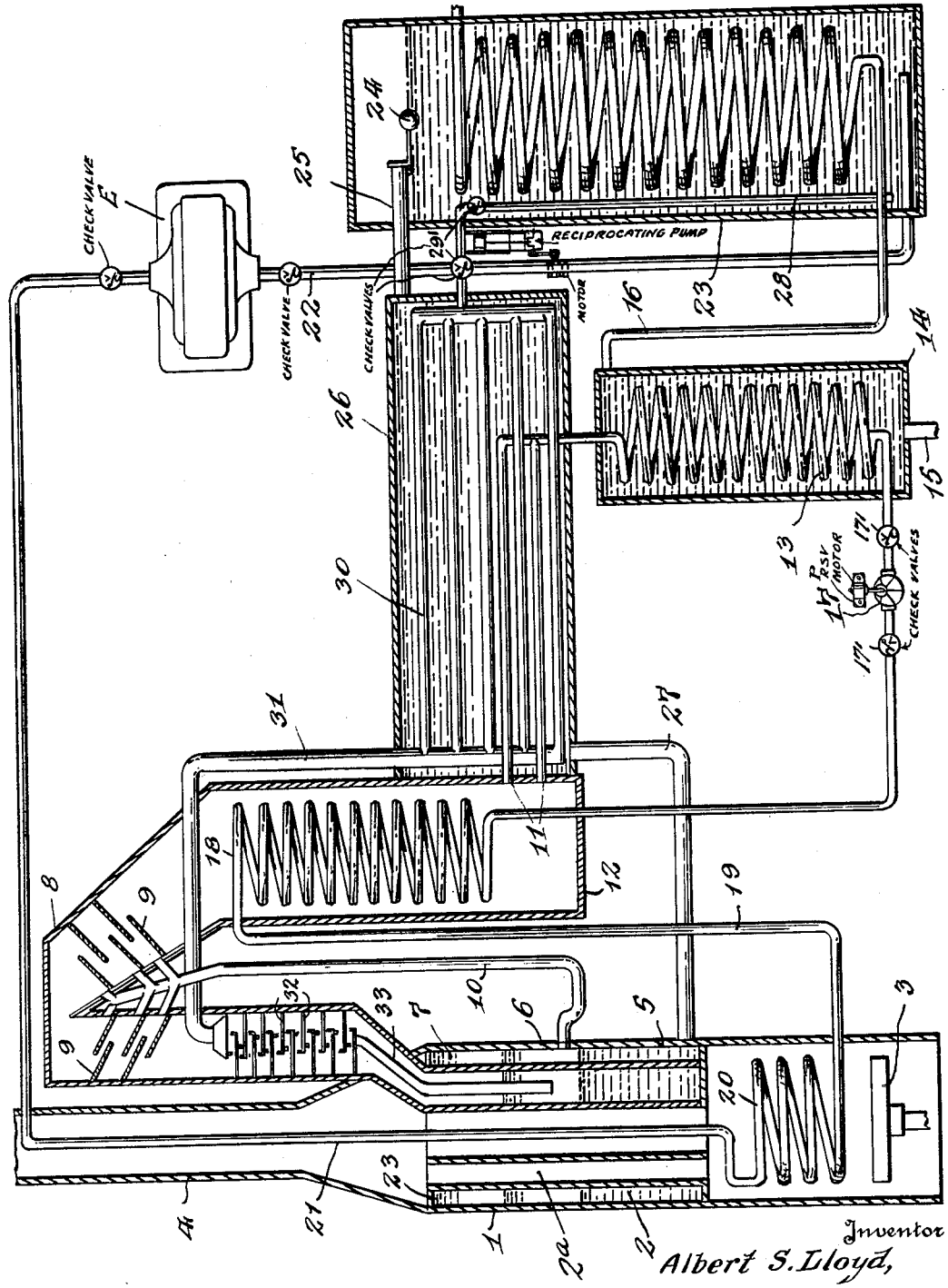
Inventor
Albert S. Lloyd,
By Robert C. Dennison
Attorney Patented May 8, 1934

1,957,893

UNITED STATES PATENT OFFICE 1,957,893

POWER SYSTEM

Albert S. Lloyd, Los Angeles, Calif.

Application January 22, 1931, Serial No. 510,576

7 Claims. (Cl. 60—36)

This invention relates to a process and apparatus for obtaining external work from ammonia vapor, and in particular relates to a process and apparatus for utilizing ammonia gas to operate engines of the reciprocating piston or turbine types.

An object of the invention is to provide an apparatus for utilizing ammonia vapors wherein the ammonia is gasified, condensed to a liquid, regasified, superheated, and while in the superheated condition, introduced into a prime-mover where it accomplishes useful work without substantial condensation. The ammonia gas, after accomplishing its work, being absorbed in water and redistilled for accomplishing a further cycle of work. The process is a continuous cycle and in as much as the apparatus is sealed the ammonia is utilized over and over without any substantial loss.

The accompanying drawing illustrates a diagrammatic layout of the apparatus utilized in carrying out this process, and is merely illustrative of the practical embodiment of the invention to illustrate the continuous cycle, etc., and applicant does not wish to be limited to this exact structure, reserving to himself the use of equivalent apparatus for accomplishing the results obtained by this process.

Referring to the drawing, it will be seen that 1 denotes a boiler, generator, or distilling apparatus having a plurality of vertical liquid heating tubes 2 which receive their heat from any suitable heating source such as gas burner 3. The sensible heat from gas burner 3 heats the ammoniacal liquid in vertical pipes 2 by passing in contact throughout their entire length through parallel passages 2a and the products of combustion pass to the atmosphere through stack 4.

The vertical tubes 2 contain the ammonia, which in the lower portion of the tubes adjacent the flame and as indicated at 5 is in the form of a weak ammoniacal liquid, while the ammonia at the portion indicated at the numeral 6 is in the form of a strong ammoniacal liquid, while the ammonia at the upper portion of the tubes as indicated at 7 is in the form of ammonia gas. The heating means being in operation, heat is absorbed by the liquid in tubes 2 and the ammonia gas distilled off, which ascends and passes upwardly into rectifier 8. The ascending ammonia vapors contain a substantial amount of water vapor and considerable amounts of combined ammonia; the water content being removed from the ascending vapors by contact with the series of baffles 9 which present a tortuous path to the vapors and impede their travel. The water as removed, which is principally strong ammoniacal liquor, flows by gravity back to section 6 of the boiler through pipe 10.

In as much as the gaseous ammonia is under pressure, it passes downwardly through the enlarged portion of the rectifier indicated by numeral 12, and escapes from the lower portion thereof through pipes 11, and hence to condensing coil 13 positioned in casing 14. Cold water is introduced into the bottom of casing 14 and is discharged therefrom through pipe 16. The ammonia vapors upon passing downwardly through condensing coil 13 has its latent heat removed by the cooling water flowing in counter-current thereto and the ammonia gas is condensed into a liquid which is removed from the lower portion of the coil 13 by means of a suitable rotary pump 17 of any well known construction and by means of this pump is forced through coil 18 positioned in the enlarged portion 12 of the rectifier, heretofore described. Suitable valve connections 17' are associated with the rotary pump 17 and the pipe connecting the coils 13 and 18. Coil 18 accomplishes a dual purpose in as much as it removes a substantial number of heat units from the ammonia vapor which is passing downwardly through chamber 12 on its way to condensing coil 13, and at the same time commences the regasification of the liquid ammonia being forced upwardly through the coil 18.

After being thus regasified, the ammonia vapor, under high pressure, passes downwardly through pipe 19 and is introduced into coil 20 mounted directly above the gas burner 3 in the boiler or generator 1. Coil 20 receives a large amount of heat from burner 3 and superheats the ammonia gas passing therethrough, and increases enormously the pressure thereof. As the superheated high pressure gas ascends from coil 20 through 21, its pressure is further increased and it becomes further superheated in as much as pipe 21 is positioned in the course of the hot gases ascending between pipes 2 and lies for a substantial distance in stack 4. Pipe 21, containing superheated, high-pressure gas, runs directly to the inlet side of a suitable prime-mover E which may be any type of expansive chamber engine or turbine. It is to be understood that the ammonia gas, as it passes to prime-mover E, is in such highly heated condition and under such heavy pressure that practically no condensation takes place while it is accomplishing its useful work therein, after accomplishing its work, the low pressure gas is exhausted through conduit 22 and discharged into the lower portion of absorber 23. As the low pressure exhaust ammonia bubbles through the water, with which the absorber is filled, it is dissolved therein. The weak ammonia water needed to maintain the continuous cyclic operation of the process is derived from the lower portion of the generator 1 which, because of the pressure exerted on it, flows outwardly through pipe 27, heat exchanger 26 and is introduced into absorber 23 through conduit 25 provided with float valve 24.

As more and more ammonia gas is absorbed by the water in absorber 23, its specific gravity is increased and it tends to sink to the bottom of the absorber casing where the strong ammoniacal liquor is removed through pipe 28 by means of reciprocating pump 29 of any well known construction. Suitable valve connections 29′ are associated with the reciprocating pump 29 and the pipe 28. This strong ammonia water is forced by the pump 29 through pipes 30 which are positioned in heat exchanger 26. In passing through the heat exchanger, the strong ammonia liquid absorbs a substantial amount of heat units from the weak ammonia water which is also passing through the heat exchanger exteriorly to the pipes 30 and the strong ammonia water then passes out of the heat exchanger through pipe 31 where it is discharged into rectifier 8 and flows downwardly over a series of baffles 32, and subsequently discharged from the bottom of pipe 23 into portion 6 of the generator or boiler 1. In flowing downwardly over baffles 32, some of the ammonia gas content in the strong water is liberated and passes upwardly and into the gaseous circuit of the apparatus together with the gas being driven off from the anhydrous ammonia solution in the generator or distilling apparatus 1.

Thus it will be seen that the present invention consists of a continuous cyclic process and apparatus for the utilization of ammonia gas for obtaining vapor under high pressures and temperatures to be utilized in creating external energy by means of a suitable prime-mover.

I claim:

1. The process of producing a work fluid which consists in distilling ammonia gas from an ammoniacal liquid, dehydrating said gas, liquefying said gas, regasifying said liquefied gas, superheating said gas, supplying said superheated gas to a convertor of fluid energy, and reabsorbing said gas in the said ammoniacal liquid.

2. An apparatus for supplying work fluid to a suitable prime-mover, including an ammonia still, heating means therefor, an exhaust conduit leading from said still, baffles in said conduit, to remove entrained moisture from the vapors generated in the still and passing through the conduit, a condenser, a regasifier, a pump conveying liquid ammonia from the condenser to the regasifier, a superheater coil for receiving the regasified liquid mounted adjacent the said heating means, a prime-mover receiving superheated ammonia gas from said coil, an absorber for receiving the exhaust gas from the prime mover, and a second pump conveying ammoniacal liquid from said absorber back to said still.

3. A cyclic process for generating a work fluid which consists in distilling ammonia gas from a strong ammoniacal liquid, dehydrating said gas, cooling said gas, condensing the cooled gas, regasifying the condensed gas, superheating the regasified gas, and operating a prime-mover thereby, dissolving the exhaust gas from the prime-mover in a weak ammonia liquor to form a strong ammonia liquor, and redistilling the strong ammoniacal liquid for regeneration of the work fluid.

4. A cyclic process of generating and utilizing a gaseous work fluid which consists in driving off the ammonia gas dissolved in an ammoniacal liquor, dehydrating the ammonia gas and returning the hydrate for further distillation, cooling and condensing the liberated ammonia gas, regasifying the condensed gas, superheating the same prior to its use as a working fluid for operating a prime mover, the ammonia gases exhausted from the prime mover passing into an absorber to combine with a weak ammonia liquor, the strong ammoniacal liquor so formed being returned to the liquor which is initially heated for the generation of the ammonia gas.

5. The process of producing a working fluid which consists in generating an anhydrous ammonia gas, dehydrating the gas, then passing the gas through a heat exchanger where it is cooled, then condensing the gas, then regasifying the condensed gas, then superheating the regasified condensed gas to increase the working pressure and temperature thereof to operate a converter of fluid energy, absorbing the gas exhausted from the converter, then passing the strong ammonia liquor through the heat exchanger to take up the heat of the counter flowing anhydrous ammonia gas passing through said heat exchanger, and finally returning the ammonia liquor to the generator.

6. The process of producing a working fluid which consists in generating an anhydrous ammonia gas, dehydrating the gas, passing the gas through a heat exchanger where it is cooled, then condensing the gas, then regasifying the condensed gas, then superheating the regasified condensed gas to increase the working pressure and temperature thereof for operating a converter of fluid energy, absorbing the gas exhausted from the converter in an absorber, the weak ammonia liquor passing from the generator through the heat exchanger into the absorber, the strong ammonia liquor being pumped from the absorber into the heat exchanger where it is heated by the hot weak ammonia liquor and by the anhydrous ammonia gases prior to the strong ammonia liquor returning to the liquor in the generator.

7. An apparatus for supplying a work fluid to a prime mover comprising an ammonia still where anhydrous ammonia gases are generated, heating means therefor, a dehydrator in communication with the still for receiving the ammonia gases liberated, a heat exchanger for receiving hot weak ammonia liquor from the still and through which the anhydrous ammonia gases generated are adapted to pass, a condenser for the anhydrous ammonia gas, a regasifier for the condensed ammonia gas, a pump conveying the liquid ammonia from the condenser to the regasifier, a super heater for receiving the regasified ammonia liquid, a prime mover receiving the superheated ammonia gas, an absorber filled with weak ammoniacal liquor in communication with the prime mover to receive the exhaust ammonia gas therefrom forming a strong ammoniacal liquor, and means for delivering the strong ammonia liquor in the absorber through the heat exchanger and returning the strong ammonia liquor to the still.

ALBERT S. LLOYD.